(12) United States Patent
Herold et al.

(10) Patent No.: US 10,964,073 B2
(45) Date of Patent: Mar. 30, 2021

(54) METHOD FOR THE RECONSTRUCTION OF A TEST PART IN AN X-RAY CT METHOD IN AN X-RAY CT SYSTEM BY MEANS OF AN INTELLIGENT PATH CURVE

(71) Applicant: YXLON INTERNATIONAL GMBH, Hamburg (DE)

(72) Inventors: Frank Herold, Ahrensburg (DE); Philipp Klein, Hamburg (DE); Sarajaddin Rahmani, Hamburg (DE)

(73) Assignee: YXLON INTERNATIONAL GMBH, Hamburg (DE)

(*) Notice: Subject to any disclaimer, the term of this patent is extended or adjusted under 35 U.S.C. 154(b) by 247 days.

(21) Appl. No.: 15/777,463

(22) PCT Filed: Feb. 3, 2017

(86) PCT No.: PCT/EP2017/000141
§ 371 (c)(1),
(2) Date: May 18, 2018

(87) PCT Pub. No.: WO2017/133847
PCT Pub. Date: Aug. 10, 2017

(65) Prior Publication Data
US 2018/0330524 A1    Nov. 15, 2018

(30) Foreign Application Priority Data
Feb. 4, 2016    (DE) .................. 10 2016 001 247

(51) Int. Cl.
*G06T 11/00* (2006.01)
*G01N 23/046* (2018.01)
*G06T 7/73* (2017.01)

(52) U.S. Cl.
CPC .......... *G06T 11/005* (2013.01); *G01N 23/046* (2013.01); *G06T 7/73* (2017.01);
(Continued)

(58) Field of Classification Search
CPC .................. G06T 11/005; G06T 7/73; G06T 2207/10081; G06T 2207/30204;
(Continued)

(56) References Cited

U.S. PATENT DOCUMENTS 7,376,213 B1 * 5/2008 Wei .................. A61B 6/032
378/39
10,163,233 B2 * 12/2018 Ding .................. G06T 11/008
(Continued)

FOREIGN PATENT DOCUMENTS

| JP | 20051219633 A | 5/2005 |
|---|---|---|
| JP | 2011209054 A | 10/2011 |
| JP | 2013047644 A | 3/2013 |

OTHER PUBLICATIONS

JPO Examination Report—Notification of Reasons for Refusal, dated Jan. 8, 2018, issued for the corresponding JP Application No. JP 2017-549499.

*Primary Examiner* — Kim Y Vu
*Assistant Examiner* — Molly Delaney
(74) *Attorney, Agent, or Firm* — Abelman, Frayne & Schwab (57) ABSTRACT

A method for the reconstruction of a test part in an X-ray CT method in an X-ray CT system, which has an X-ray with a focus, an X-ray detector, and a manipulator which moves the test part within the X-ray CT system. To generate recordings of the test part in various positions, the manipulator travels a predefinable parameterizable path-curve and makes recordings at triggered positions. For each recording, the position of the manipulator is determined and the respective associated projective geometry is calculated. Thereafter, a further path curve is followed having different parameters from the preceding path curve. The path curve is determined iteratively by means of an optimization algorithm, at the value of which the quality function is minimal. For each test (Continued)

part, a CT reconstruction is carried out by means of a suitable algorithm with reference to the allocation of the individual recordings to the respective projective geometry.

8 Claims, 4 Drawing Sheets

(52) U.S. Cl.
CPC ........... *G01N 2223/3307* (2013.01); *G01N 2223/401* (2013.01); *G01N 2223/419* (2013.01); *G06T 2207/10081* (2013.01); *G06T 2207/30204* (2013.01); *G06T 2211/416* (2013.01)

(58) Field of Classification Search
CPC ............ G06T 2211/416; G01N 23/046; G01N 2223/3307; G01N 2223/401; G01N 2223/419
See application file for complete search history.

(56) References Cited

U.S. PATENT DOCUMENTS

| | | | |
|---|---|---|---|
| 2008/0317383 A1 | 12/2008 | Franz et al. | |
| 2013/0156151 A1* | 6/2013 | Sugaya | A61B 6/545 378/16 |
| 2014/0307934 A1* | 10/2014 | Batenburg | G06T 11/005 382/131 |
| 2018/0199999 A1* | 7/2018 | Syverson | A61B 34/76 |
| 2018/0268561 A1* | 9/2018 | Zebaze | G06T 7/13 |

* cited by examiner

METHOD FOR THE RECONSTRUCTION OF A TEST PART IN AN X-RAY CT METHOD IN AN X-RAY CT SYSTEM BY MEANS OF AN INTELLIGENT PATH CURVE

CROSS-REFERENCE TO RELATED APPLICATION

This application claims the benefit under 35 U.S.C. § 371 to international application No. PCT/EP2017/000141, filed on Feb. 3, 2017, which claims priority to German patent application No. 102016001247.1, filed Feb. 4, 2016, the contents of which are incorporated by reference herein in their entireties.

FIELD OF THE INVENTION

The invention relates to a method for the reconstruction of a test part in an X-ray CT method in an X-ray CT system, which has an X-ray source having focus, an X-ray detector, and a manipulator, which moves the test part within the X-ray CT system, wherein, to generate recordings of the test part in various positions, the manipulator travels a predefinable path curve and makes the recordings at triggered positions.

BACKGROUND OF THE INVENTION

Methods for the three-dimensional reconstruction of test parts taking into consideration a particular projective geometry from projections are known from the field of computed tomography (CT).

The projections must be recorded from different projection directions. Depending on how completely the object has been imaged along the so-called path curve in accordance with the Tuy-Smith theory (TST), the imaging of the reconstructed volume is more detailed.

For the three-dimensional reconstruction of an X-ray-transparent test object from projections in different projection directions in an X-ray CT system, an exact knowledge of the projective geometry is necessary. In terms of X-ray imaging, the projective geometry describes the position of the test object relative to the focus of the X-ray source and the X-ray detector. To check the actual projective geometry in each projection, distinctive points of the test object must be relocated exactly in projections in different projection directions. In the case of transparent test objects, these points can be superimposed with unknown object structures, with the result that at worst the points are not recognized at all, or the position thereof cannot be determined error-free. The precise determination of the respective projective geometry of each image is known from the state of the art; markers are used for this.

An object of the invention is to provide a method in which, for the reconstruction of a test part, an optimization of the path curve on which the test part is moved within the X-ray CT system by means of a manipulator is effected.

The object is achieved by a method with the features of claim 1. The quality of the reconstructed volume is improved by choosing a parameterizable path curve and varying this intelligently with respect to the orientation of the object, in order to optimize the material's ability to be radiographed. The variation in or the travel over this intelligent path curve requires at least one variable parameter, which alters the orientation of the test part with the aid of the manipulator. According to the invention, to generate recordings of the test part in various positions, the manipulator travels a predefinable path curve. At triggered positions, in each case, a recording of the test part is made. The positions in question can be defined in advance. For each of these recordings, the position of the manipulator is determined and, from this, the respective associated projective geometry is calculated. Then, a value of a quality function is calculated for this path curve and, after that, a further path curve is followed which has different parameters from the preceding path curve. In the meantime, further recordings of the test part are generated at the triggered positions and the value of the quality function is in TURN calculated for these. This last-named step is repeated. The path curve is determined iteratively (in relation to the test part moved in some circumstances) by means of an optimization algorithm, in which the value of the quality function is minimal. After that, further test parts identical to the named test part are tested such that the path curve previously identified as optimal is travelled. At the end, for each test part, a CT reconstruction is carried out by means of a suitable algorithm with reference to the allocation of the individual recordings, which were made along this optimal path curve, to the respective projective geometry. For the reconstruction, software known from the state of the art, for example the "CERA Xplorer" software from Siemens Healthcare GmbH, is used.

SUMMARY OF THE INVENTION

An advantageous development of the invention provides that the determination of the position of the manipulator is effected by means of markers which are arranged fixed to the test part while the X-ray CT method is being carried out. A very good determination of the respective projective geometry of each recording can thereby be achieved. Manipulators with low precision with respect to their positioning can thus also be used.

A further advantageous development of the invention provides that the manipulator is a six-axis industrial robot. Such a manipulator can approach any desired position within the X-ray CT system at high speed.

A further advantageous development of the invention provides that, for example, the following quality function is used, which guarantees an optimal ability of the material to be radiographed, on certain assumptions:

$$F = \sqrt{\alpha\left(1 - \frac{Q_{min}}{Q_{opt}}\right)^2 + \beta\left(1 - \frac{Q_{min}}{Q_{opt}}\right)^2\left(1 - \frac{\sigma}{\sigma_{opt}}\right)^2 + \gamma\left(1 - \frac{E}{E_{opt}}\right)^2} \doteq min.$$

A further advantageous development of the invention provides that the optimization algorithm is a downhill simplex algorithm. For a quality function like the above, this optimization algorithm requires a small number of iterations in order to determine the optimum parameters of the path curve.

A further advantageous development of the invention provides that, for the selection of the predefinable path curve, the following flow into a further quality function individually or in any desired combination: path curve length, magnification, space requirement, complexity, features for the industrial robot's ability to travel, extensibility, optimizability, redundancy. A path curve suitable for the application and the system can thereby be identified.

A further advantageous development of the invention provides that the method is interrupted after a predefinable maximum number of iteration steps and the method for testing the further test parts is carried out with the path curve of the last iteration step. As the result constantly approaches the optimum with each iteration step, the time required for the optimization is limited to a predefined value.

A further advantageous development of the invention provides that the optimization of the parameters of the path curve is effected by tilting the test part. The completeness of the trajectory of the focal point according to the Tuy-Smith theory is thereby not altered, as it is not the relative path curve of the manipulator that changes with the test object, but only the orientation of the test part itself.

All of the features of the advantageous developments specified in the dependent claims belong to the invention, both separately in each case individually and in any desired combinations.

DETAILED DESCRIPTION OF THE EMBODIMENTS

In the following, an advantageous embodiment example of a method according to the invention is explained.

The method according to the invention proceeds in a conventional X-ray CT system (for example the "Y.MU56 TB" model from YXLON International GmbH), wherein, to date, an industrial robot (hereafter called robot), for example the "MOTOMAN MH5" model from Yaskawa Electric Corporation, has been used. For example, the "Y.TU-225-D04" model from YXLON International GmbH is used as X-ray tube and, for example, the "XRD 0822 AP18 IND" model from PerkinElmer is used as X-ray detector.

Figure 1:
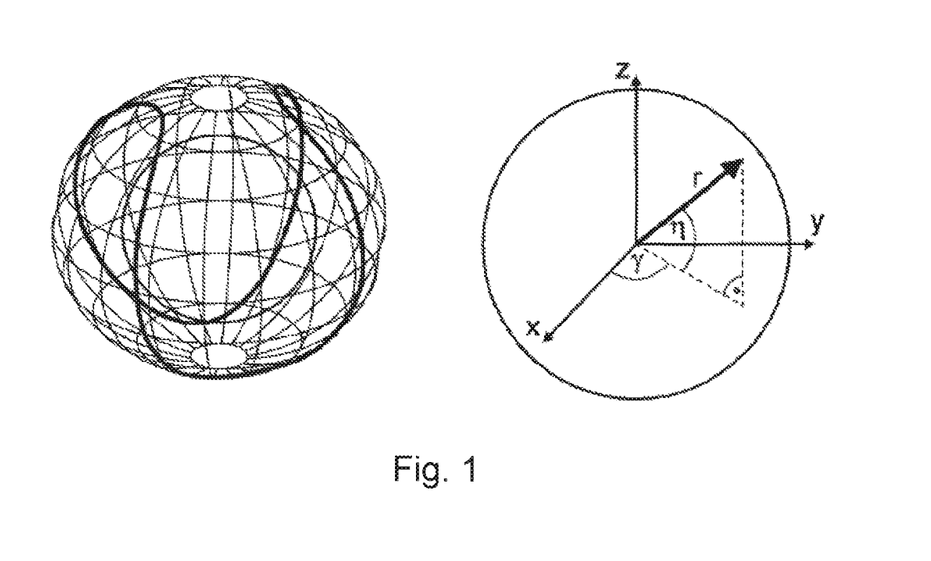
FIG. 1 shows the progression of a TB path curve and the description thereof by means of polar coordinates.

The implementation of a path curve is effected by the relative movement of a robot. Various path curves are conceivable, among others LC (Line-Circle), CC (Crossing Circles), CLC (Circle-Line-Circle), Helix, TB (Tennis Ball—see FIG. 1).

The X-ray CT system essentially consists of three units. One of these is a radiation-shielding lead cubicle, in which the X-ray source (cone beam), the X-ray detector (hereafter called detector) and the robot are located. Here a test part is held and moved by the robot and X-radiation is shone through it. The detector converts the incoming radiation and generates the corresponding X-ray image. Another unit of the system consists of a computer with an operator console. This computer runs the system's operating software, through which a user can make adjustments and control the scanning process. The images generated by the detector are stored on the computer and can then be examined. The last unit consists of a control cabinet including a programmable logic controller (PLC) for controlling the system.

Coordinate System

The suitable choice of a coordinate system leads to a simpler description and implementation of a path curve. Therefore, a coordinate system to which the coordinates of the calculated points relate should be selected as early as during the generation of the path curve.

Figure 2:
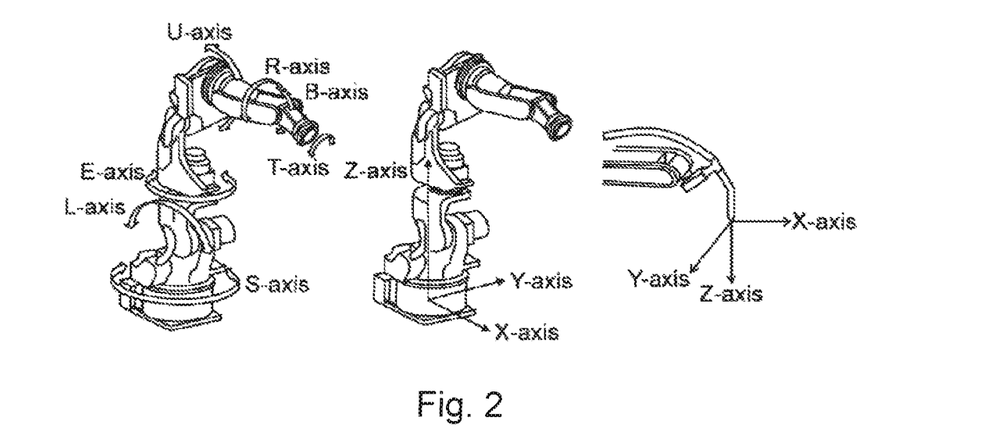
FIG. 2 shows various coordinate systems of a robot.
Figure 3:
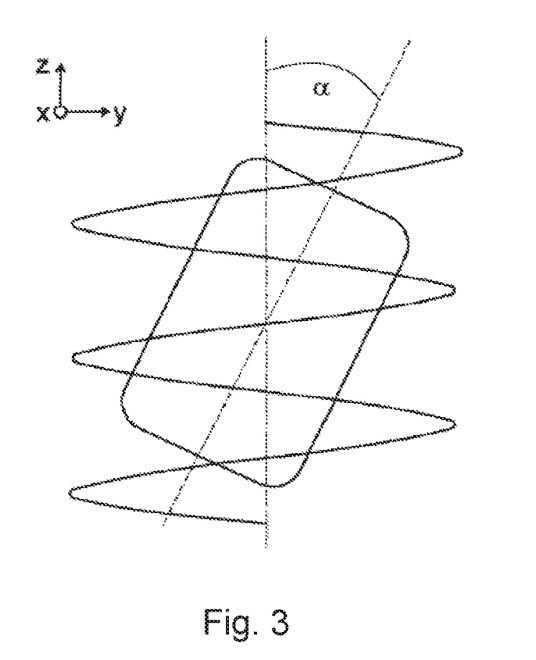
FIG. 3 is a representation of a helical path curve with tilted test part.

The middle image in FIG. 2 shows the three-dimensional Cartesian coordinate system the origins of which are in the rotatory centre of the first axis (S-axis) of the robot. This coordinate system is fixed in space. It is well-suited to the implementation of circular path curves with a setting angle, thus a rotation with simultaneous tilting of the test part (represented for a helical path curve by way of example in FIG. 3). For a given setting angle, the rotation is implemented such that only one coordinate is altered, namely the orientation about the Z-axis. The three-dimensional Cartesian coordinate system is also suitable, above all, for the implementation of movements along lines. During travel along a line, such as e.g. during adjustment of the height in the Z-direction, it is sufficient to alter only one coordinate (Z-coordinate) in the three-dimensional coordinate system.

Finally, in the right-hand image in FIG. 2, the so-called tool frame coordinate system is illustrated. The origin of this coordinate system lies in the TCP (Tool Centre Point) of the test part. As this coordinate system moves with the test part and is always located identically relative to the latter, movements relative to the current position of the test part can be described particularly well. It is suitable specifically for the implementation of path curves which have to be realized not by a rotation about one main axis (e.g. Z-axis), but by a rotation about at least two main axes. This coordinate system is used, for example, for the implementation of the TB path curve.

Quality Function

The quality function is to be formulated such that it relates to the ability of the test part to be radiographed and thus indirectly gives information about the quality of a reconstruction. A good path curve is then a parameterizable path curve which leads to a small value of the quality function.

The radiation emitted by the X-ray source shines through the test part. Depending on the material thickness along the path, individual photons are absorbed or their intensity is weakened. A remaining portion of the radiation passes through the test part and strikes the detector, which generates an image with a corresponding lightness distribution (greyscale value distribution). If a portion of the test part is more radiolucent, then a brighter image with higher greyscale values results. This applies correspondingly to less radiolucent sites. The greyscale values of the image thus correspond to the radiolucence of the test part. A recorded X-ray image is represented by an array (1D), in which the greyscale values of each pixel are stored. For example, in a 14-bit detector 214 different possible values (0-16.383) per pixel result.

Figure 4:
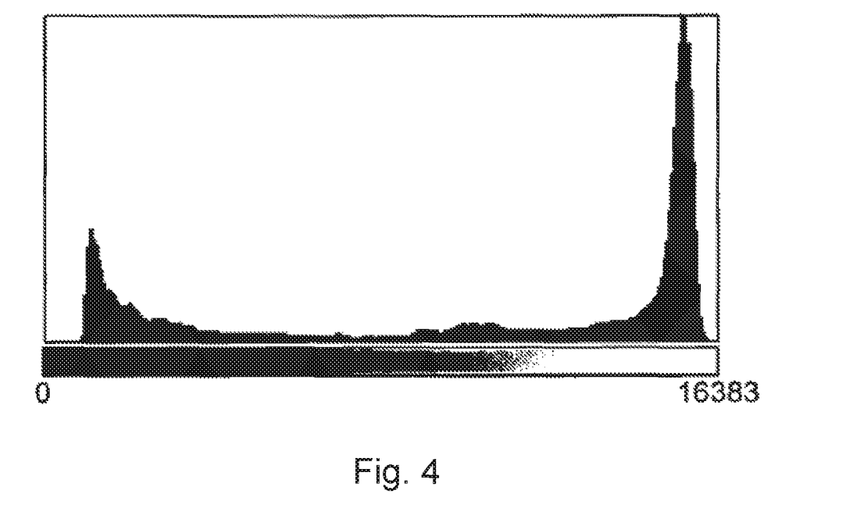
FIG. 4 is a histogram of a radioscopy image of a test part.

The frequencies of the greyscale values of the recorded image are represented graphically in a histogram, in which the greyscale value is represented on the x-axis and the respective frequency is represented on the y-axis. Such a histogram for a turbine blade is represented in FIG. 4. The two duster points (peaks) on the left and on the right edge are striking. The right-hand duster point has high greyscale values and therefore describes light pixels in the image. It can be allocated to the light background. The left-hand cluster point has small greyscale values and, in contrast, describes sites in the image which are relatively dark. It can be allocated to the test part. It will now also be shown why the turbine blade has relatively little radiolucence: the left-hand duster point lies relatively close to the left edge of the distribution. Portions of the turbine blade thus have very small greyscale values. This is to be attributed to the fact that the radiation is almost completely absorbed/attenuated at particular sites and barely reaches the detector. There is a loss of information as a result of the incoming radiation being so weak that the resulting signal is lost in the detector's noise. In this case, the resulting X-ray image is darkened and the density distribution of the test part is not visible. Accordingly, the reconstruction of the turbine blade is also flawed.

A criterion of the quality function is therefore to have its optimum at a site which leads to as large as possible a greyscale value of the image. The smallest greyscale value itself, however, is not taken into consideration as a direct measurement because it is subjected to the noise processes of the system and alters when measured again. These noise processes include the noise and the temperature-dependent behaviour of the detector itself, the stochastic nature of the direct radiation and the influence of reflected scattered radiation. Instead of the minimum greyscale value, therefore, a selected quantile of the ordered set of greyscale values is used. The 3% quantile has proved to be sufficiently stable vis-a-vis noise processes. The recording of a path curve provides a series of images. As a result, it generally involves maximizing the minimum quantile Qmin from all images in a series:

$$Q_{min} \stackrel{!}{=} \max \qquad (5.1)$$

This condition relates to the poorest image in a series. However, nothing is revealed about the distribution of the quantiles of the series of images. If, for example, two series of images have the same poor value for Qmin, then they have until now had the same quality. However, it can be the case that all images, except for the poorest, in one series of images exhibit a relatively large quantile and all images, except for the poorest, in the other series of images are only slightly better, thus their quantiles lie close to Qmin. In this case, the first series of images would be preferred over the second. In order to determine the distribution of the quantiles, the spread of the quantiles of a series in relation to the minimum quantile Qmin is taken into consideration. The calculation is effected via the variance SQmin, which is calculated as follows:

$$S_{Qmin} = \frac{1}{n}\sum_{i}^{n}(Q_i - Q_{min})^2.$$

Qi describes the quantile of the i-th image in a series of length n. Then the spread a of the quantiles in relation to the minimum quantile is given by $$\sigma = \sqrt{S_{Qmin}}$$

The maximization of the spread in the case of a relatively poor Qmin is thus likewise sought:

$$\sigma \stackrel{!}{=} \max. \qquad (5.2)$$

With the two above-named conditions of the equations 5.1 and 5.2, a quality function can be established, the optimization (minimization) of which has the result that the left-hand cluster point in the histogram of FIG. 4 is shifted as far as possible towards the right for all images in a series.

Until now, nothing has yet been revealed about the distribution of the greyscale values in the histogram of an image. In the extreme case, all pixels could have approximately the same greyscale value. The agglomeration of the frequencies at a single large and narrow peak in the histogram would then result. In this case the image would have no contrast, and thus no information. For a high information content, therefore, a flat, wide and uniform distribution of the greyscale values is desired. As a measurement of the information content, the image entropy in information theory is used. It is therefore defined by $$E = -\sum_i p_i \log_2(p_i),$$

wherein pi describes the probability of the occurrence of the i-th greyscale value ($0 \leq pi \leq 1$). The base 2 of the logarithm is selected, according to the literature, in this way because binary digits can be handled technically particularly simply. It is clear that, as a measurement, the entropy brings with it precisely the previously required conditions: if the relative proportion of the i-th greyscale value (pi) is too small or too large, then the i-th subtotal tends towards zero, as in both cases one of the factors pi or log m(pi) becomes very small. In the case of a uniform distribution the subtotals, and thus the entropy, become maximal. The calculation of the entropy relates to the distribution of the greyscale values belonging to the test part. For this, the background is identified and removed by an elaborate method. This means that in the calculation of the entropy the greyscale values of the right-hand peak in the histogram of FIG. 4 are omitted. (Methods of the Advanced Methods class).

It is therefore sought to make the entropy of a series of images as large as possible. In order to guarantee this, the average of the entropy of a series should be maximized:

$$E_{average} = \frac{1}{n}\sum_{j}^{n} E_i \stackrel{!}{=} \max, \qquad (5.3)$$

wherein Ei describes the entropy of the i-th image. This condition alone is still incomplete, as images (outliers) with very small entropies could still be present for a satisfactory average. In other words, this would mean that the entropy could scatter strongly around the average. In order to take this state of affairs into consideration, it is desirable to minimize the standard deviation of the distribution in relation to the mean value Eaverage:

$$\sigma_{average} = \sqrt{\frac{1}{n}\sum_{i}^{n}(E_i - E_{average})} \stackrel{!}{=} \min. \qquad (5.4)$$

The conditions of the equations 5.3 and 5.4 can be described with E=Eaverage−σaverage in summary by the requirement $$E \stackrel{!}{=} \max \qquad (5.5).$$

Furthermore, a reliable value range of the greyscale values (Gmin, Gmax) is defined, in which the greyscale values of the recorded images should lie. Greyscale values of images which are smaller than the tolerance limit Gmin lead to errors in the reconstruction. Greyscale values which lie above the tolerance limit Gmax lead to an oversaturation of the detector. A violation of these strict boundary conditions leads to the immediate exclusion of a path curve.

System parameters, such as voltage and current of the X-ray source, thickness and material of a filter used, intensity of the detector and integration time of the irradiation, should therefore always be chosen such that the boundary conditions are met.

The conditions of the equations 5.1, 5.2 and 5.5 are formulated in a quality function F (Qmin, σ, E) by $$F = \sqrt{\alpha\left(1 - \frac{Q_{min}}{Q_{opt}}\right)^2 + \beta\left(1 - \frac{Q_{min}}{Q_{opt}}\right)^2\left(1 - \frac{\sigma}{\sigma_{opt}}\right)^2 + \gamma\left(1 - \frac{E}{E_{opt}}\right)^2} \stackrel{!}{=} \min \quad (5.6)$$

Because the dimensions of the numerical values differ greatly, the variables are standardized. They are divided by notional optimum values Qopt, σopt and Eopt. A minimum (optimum) of the quality function F represents a point at which the variables come as close as possible to the selected optimum values. The quality function F thus represents an error term for these optimum values due to its formulation. If these values are precisely achieved, then F (Qopt, σopt, Eopt)=0. In practice this value is not usually achieved. The point is therefore to find the set of parameters of a path curve which minimizes the quality function. Values for Qopt and σopt can be estimated from measurements. The maximum possible entropy can be calculated by Emax=log 2(Np), wherein Np denotes the number of pixels of the detector. The weighting factors α, β and γ determine the priorities of the variables Qmin, σ and E. If one variable is more strongly weighted than the other variables, it is accorded a greater relevance in the optimization. Within the framework of the embodiment example of the invention, the uniform weighting α=β=γ=1 is used.

A special feature is represented by the second term of the quality function in equation 5.6 under the root. Here the error term of σ is weighted not only by β, but likewise with the dynamic factor (1−Qmin/Qopt)2, which represents the error term of Qmin. The reason for this is that the spread of the quantiles of a series of images in relation to the minimum quantile Qmin should meaningfully have a stronger weighting if the Qmin is poor and lies further away from the optimum value. If the minimum quantile Qmin is substantially larger and already lies close to the optimum, then the spread of the quantiles in relation to Qmin need not necessarily prove to be large, as the series of images already has high quantiles and thus satisfactory greyscale values.

Through the quality function in equation 5.6 each set of parameters of a path curve can be assigned a quality through the evaluation of the recorded images. Using the example of the helical path curve with a turbine blade as test part, the quality function is evaluated at discrete points in the parameter space. The quality function is a completely continuous smooth distribution.

Evaluation Criteria

Different criteria are used to select the optimum path curve for the application and the system. In addition to the above-described optimized quality, further aspects play a part in the assessment, which depend less on the choice of the test part itself. Each criterion is included in the assessment with a different weighting. If, for example, only improving the reconstruction of a particular test part has the highest priority, in particular a minimization of the quality function is sought. In this case, the criterion of optimized quality value would have a relatively high weighting. A user must determine the weighting of a criterion according to individual objectives. The criteria are optimized quality value, path curve length, magnification, space requirement, complexity, features for the robot's ability to travel, extensibility, optimizability and redundancy. These criteria are explained in the following.

Optimized Quality Value

One criterion is the optimized value of the quality function (minimum) using the optimization process for a given test part. The quality function is therefore compiled such that it represents an error term which corresponds to the path curve within the framework of the optimization of the quality. A good path curve in this sense leads to a better result of the reconstruction. The thus-obtained minima of various path curves can be compared with each other and the path curve with the smallest minimum, thus the one with the lowest quality value, is thus theoretically the best. However, this comparison is possible in practice only up to a certain extent, because an exact comparison of the quality values is dependent on different factors, which justify this comparison.

One of these factors is the number of image projections which are made along the path curve during a scanning process. A higher number of projections leads to a finer discretization of the path curve. It is clear that sufficient information about the test part for as complete as possible a reconstruction can only be gathered if the number of projections is sufficiently high. If the number of projections is low, the test part is logically not imaged from many viewing directions and thus the information content decreases.

If, for example, a circular path curve is also discretized infinitely greatly, the distance between two recording positions of the X-ray source becomes infinitely small and the projected images of two neighbouring recording positions in the case of a detector with limited resolution contain virtually the same information. As a result, an ever larger number of projections does not always lead to a greater information content. Depending on the pixel size and the resolution of the detector, the discretization should be at least so great (coarse) that images with different information are recorded. This means in turn that the maximum possible information content can be achieved by means of a minimum number of projections. As carrying out lots of projections is associated with long scanning times (high costs), the number of projections in practice is usually kept small, because the increase in information from a particular number of projections no longer justifies these costs.

Figure 5:
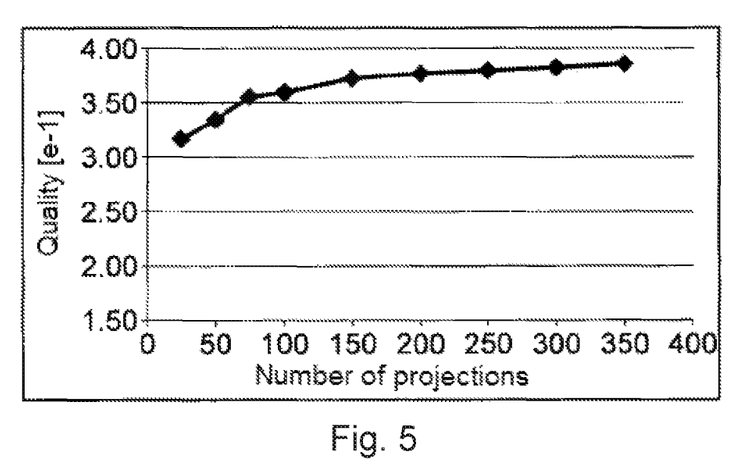
FIG. 5 is a representation of the quality of a helical path curve as a function of the number of projections.

The quality of a helical path curve for different numbers of projections is represented in FIG. 5. It is to be seen that smaller numbers of projections misleadingly result in a better quality (smaller quality value). In the case of increasing projections, the quality first changes rapidly and becomes poorer. From approx. 200 projections it passes into a saturation region, in which it no longer changes in the case of an increasing number of projections. The reason for this progression is, as already explained above, that all beam directions through the test part are taken into consideration only from a sufficiently high number of projections, which decisively impairs the quality. These viewing directions are not "seen" in the case of few projections.

Figure 6:
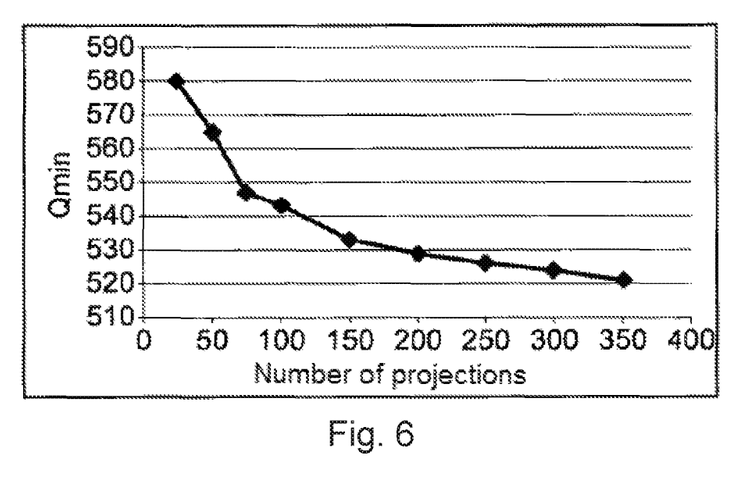
FIG. 6 is a representation of the progression of the quantile of a helical path curve as a function of the number of projections.

FIG. 6 illustrates how much the 3% quantile (Qmin) of a series of images, which also strongly determines the quality of a series of images, alters in the case of a larger number of projections. Consequently, the value of Qmin falls by up to 11% in the case of an increasing number of projections.

The comparison of different path curves on the basis of the quality therefore in practice proves to be more difficult, because different path curves in principle have different numbers of projections and the quality depends on this number. The question therefore arises as to how large the number of projections of one path curve and how large the number of projections of the other path curve must be in order for the comparison to be meaningful. An extremely large number of projections in the case of both path curves would solve this problem, because the quality values would then already be located in the saturation region. However, this is associated with extremely long scanning times and is unrealistic in practice.

Path Curve Length

A further criterion for the comparison of two path curves is the length of a path curve itself. This length depends on the magnification. Two circular path curves are of different lengths if they have different radii (magnifications). In order to create a basis for a meaningful comparison, path curves are therefore compared with respect to their length at the same magnification.

Figure 7:
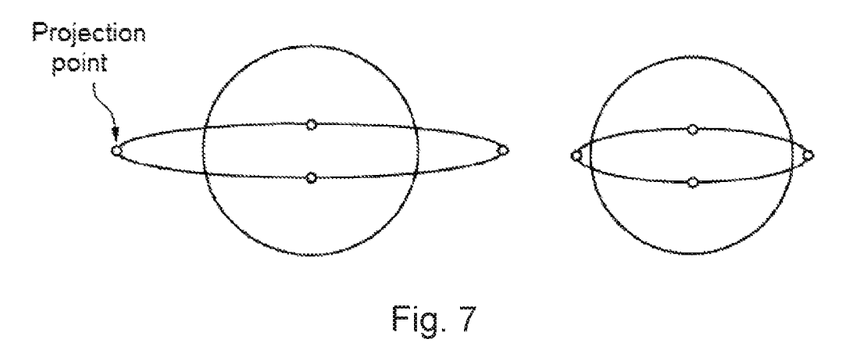
FIG. 7 is a comparison of circular path curves with different magnification.

The path curve length implicitly gives information as to the number of projections which are recorded during a scan along a path curve. In order that the comparison of the lengths of different path curves with respect to the number of projections is consistent and meaningful, the curves are discretized uniformly with respect to the recording positions and an identical distance from X-ray source to object is maintained. The latter is illustrated further in FIG. 7. Here, two circular path curves are represented with identical discretization (four projection points) but different magnifications (circle radii). The left-hand path curve has a longer path curve length than the right-hand path curve. However, the numbers of projections are identical. This would contradict the formulation above. At the same magnification (circle radii), on the other hand, the path curve length gives valid evidence as to the number of projections. This state of affairs can be transferred to different path curves.

A longer path curve length thus corresponds to a higher number of projections and thus a higher number of images which are recorded. These images are utilized in subsequent processes, such as e.g. the reconstruction. In the case of an increasing number of images, the outlay on computation and storage associated therewith also increases. This aspect plays a part above all when the chosen image format is relatively large (storage space) and the power of the computer is insufficient. If images are captured by a 14-bit detector and stored in the Tagged Image File Format (TIFF) with a file size of 2 MB, a file volume to be evaluated of 3 GB already results, assuming 1,500 required projections for the reconstruction of a circular path curve.

In the case of a higher number of projections, the duration required by a scan also increases. The time required for recording a series of images depends on how quickly the imaging of the system can be carried out in succession.

It is likewise to be borne in mind that the image recording during the movement can generate a blurring in the image and thus likewise limits the minimum processing time. In a usual scan, the images are recorded in a stationary state. For this, the robot travels to a projection point, waits until the image recording has been completed and only then begins to move further. This approach is likewise followed here. Starting from the above example and a required duration of 1 second per projection, a total duration of 25 minutes already results for a simple circular path curve.

It is of great interest to keep the scan duration as short as possible. This is desired not only in order to save energy (costs), but also because operating parameters change, such as e.g. the temperature and thus the detector's behaviour. The longer a scan lasts, the more strongly these parameters can change and thus influence the quality of the recorded series of images. For this and the above-named reasons, in the comparison, a path curve with a shorter path curve length is to be assessed as the better one.

Magnification and Space Requirement

The magnification of a path curve describes the size in which the projected image of the test part is imaged on the detector. The magnification as a comparison criterion of a path curve reflects how large the projected recordings during a scan along this path curve can be at most. A larger recording is advantageous because it represents the test part in a higher resolution and makes details of internal structures more visible. The magnification is formally defined by the distance from the X-ray source to the TCP of the test part. This distance is called Focus-Object Distance (FOD). The larger the FOD is, the smaller the image projected on the detector becomes. As a result, a path curve with a stronger magnification is the one that has a smaller FOD.

The allowed magnifications of the path curves in question depend primarily on the minimum admissible FOD from which the completeness condition according to TST is violated. The completeness test is conducted taking into consideration the effective cone angle of the X-radiation. In the case of a larger cone angle, the test part is radiographed in several directions and the path curve can remain complete even in the case of smaller FODs. If the cone angle is too small, this will have a negative effect on the minimum admissible FOD and thus on the maximum admissible magnification. It can therefore be understood that, for example, the CLC path curve allows a stronger magnification than the LC path curve as, for a given cone angle, the circular path curve of the LC path curve must shine through the component completely but in the case of the CLC path curve the shining-through can be split onto two circles.

A further property which is related to the magnification is the three-dimensional space requirement of the path curve. A path curve is implemented by the robot which holds the test part in its gripper carrying out the relative movement. For this movement, free space is required in the system (X-ray cubicle). This space is usually limited such that, although there is sufficient space along the height, geometric boundary conditions are to be adhered to in the longitudinal direction (beam direction) in order that a collision primarily with the X-ray source or the detector is prevented. This thus means that the maximum admissible FOD is limited. The path curves which only allow weak magnifications (larger FODs) are primarily affected by this limitation. This is because, precisely in this case, it can happen that the required FOD does not conform to the geometric boundary conditions.

It can be summarized that a path curve which allows a strong magnification requires less three-dimensional space. A path curve which requires little space is to be assessed, in the comparison, as the better one.

Complexity

Another comparison criterion is the complexity of a path curve. It describes how complex the progression of the path curve is and gives information as to what outlay is made to implement this path curve in practice.

A path curve is realized by the robot such that it travels a sequence of coordinates which are transferred to it by means of a robot job. These points are calculated beforehand from a mathematical model of the path curve. However, the more complex the path curve is, the more elaborate the mathematical description becomes and the more difficult the discretization becomes. In some circumstances the points of the path curve must be calculated approximately via an auxiliary model. This fact is illustrated using the example of the TB path curve, the discretization of which traces back to the solution of elliptical integrals which cannot be solved analytically. As the complexity increases, so does the error rate during the implementation.

A further point is the subjective assessment of the correctness of a path curve. In the first test steps, the user can already assess path curve elements, such as lines and circles, for their correct implementation with the naked eye. An incorrect path curve parameter of a more complex path curve, on the other hand, is relatively difficult to recognize, because the estimation of the correctness of this path curve can be poorer. In this case, an error becomes noticeable instead at a later point in time, which can have a negative effect on the efficiency.

The degree of complexity is reflected in the extent to which the path curve consists of simple straight line and circle elements (e.g. LC path curve) or whether it is a combination of these more unusual elements compared with others (e.g. TB path curve). The path curves mostly consist of line and circle elements. Within the framework of the embodiment example of the invention, the following state of affairs applies during the implementation of these path curves: on the part of the robot, the linear elements of the path curves are realized by movement along one of the main axes in the three-dimensional coordinate system. This movement is therefore implemented by alteration of a coordinate. The circle elements of the path curves are realized by rotation about one of the main axes. This rotation is likewise implemented by the alteration of a coordinate (orientation) in the three-dimensional coordinate system. Path curves which do not consist only of line and circle elements (helical and TB path curves) are realized by alteration of several coordinates in each step. The degree of complexity of a path curve can therefore be reflected by how many coordinates of the robot in the three-dimensional coordinate system change during the implementation in each step. The complexity implicitly gives information as to how easy it is to implement a path curve in practice.

Robot-Specific Features

A further comparison criterion relates to features of the robot which relate to the ability of the path curve to be travelled or the quality of the recorded images along a path curve.

One of these features is the limitation of the last axis of rotation (T-axis) of the robot used. As standard it is set such that it carries out two full revolutions, thus can rotate 0°-720°. A further rotation would overstretch and damage the cables of the electronics of the robot gripper used. This limitation has an effect on the ability of path curves which require a rotation of the T-axis over 720° to be travelled.

This can be illustrated, for example, on the basis of the helical path curve in the upright position. The helix is here realized by an alteration of the height and by a rotation of the T-axis. After two turns of the helix, the axis has rotated through 720°. To travel the next turn, a further rotation is required, but cannot be implemented by the T-axis. For this reason, once the limitation has been reached, the actual travel of the path curve is interrupted, with the result that the T-axis can be rotated back through 360°. In this phase, no images are recorded. After the rotation, the robot is located at the same site as before with respect to the coordinate system and the path curve can then be continued. These relocation movements, which are not part of the actual path curve, usually have a negative effect on the precision, as the fact that after the relocation phase precisely the same position as before the relocation movement is attained is only given to a limited extent due to imprecisions of the robot and mechanical play. A path curve is therefore desirable which can be realized with as few relocation movements as possible.

These relocation movements also include beginning a point again based on the character of the path curve itself, such as e.g. in the case of the CC path curve. After travelling the first circle, the robot must begin at the starting point of the second circle. While the relocation movements due to robot-specific limitations can be prevented by improvement or replacement of the hardware components, relocation movements due to the nature of a path curve are unavoidable.

Another feature which has an indirect influence on suitability with respect to a path curve is the extent of the interactions of elements which belong to the robot and influence the quality of the recorded images. These disruptive elements, in addition to the test part, are likewise to be seen in the projected images and thus impair the result. The impairment can lead to a distorted image analysis as well as to a flawed reconstruction. The occurrence of such disruptive elements in the recordings of a series is often unavoidable because recordings of the test part from various viewing directions are needed for the completeness of the path curve. The disruptive elements primarily involve the robot gripper used itself, which consists of a dense material and is to be clearly seen in the X-ray image.

In order to prevent the influence of the robot gripper in the images of a recorded series, the gripper can be cut out of the images, where possible. For this purpose, an algorithm has been devised here, which is based on the flood fill algorithm in computer graphics. This examines the bottom third of an image, in which the gripper is usually not imaged, in predefined test pixels and identifies a pixel corresponding to the test part. For the recognition, a threshold is defined, below which a greyscale value can be allocated to the test part. Starting from this starting pixel, surrounding pixels are examined for their greyscale values and assigned to either the test part or the surroundings. In the recursive approach, for each pixel the four (or eight) neighbouring pixels are tested. This approach has the disadvantage that, because of the high number of recursions, it can lead to a stack overflow (buffer overflow of the memory) and, because of repeated and thus superfluous testing of the same pixels, it requires a relatively long computation time. If this algorithm is used in order to remove the robot gripper from a series of 50 images, then it requires approximately four minutes of computation time.

For this reason, the iterative approach (based on a memory stack) is followed, in which pixels in the image are tested along lines. This approach is not only safer in the sense of a stack overflow, but also substantially faster, because the unnecessary testing of already tested pixels is greatly reduced.

Through the above algorithm, all pixels which represent the test part can be determined. All other pixels therefore describe the surroundings, such as gripper and background. They are assigned a neutral greyscale value, whereby the gripper, among other things, is removed as desired. Finally, a processed image forms on which only the test part with a neutral background is to be seen.

However, it is not always possible to apply the above-named algorithm. It is problematic when disruptive elements have a similar greyscale value to the test part and overlap the contours of the latter in the projected recording. In this case, the contours of the test part coalesce with those of the gripper over the imaged gripper screw. As a result the algorithm is no longer capable of distinguishing between greyscale values of the test part and greyscale values of the gripper. Therefore, the test part can no longer be clearly determined. The lowering of the tolerance limit can, in some circumstances, lead to a better separation, but it usually results in parts of the test part itself being "cut out".

Extensibility

Another comparison criterion is the possibility of a suitable extension of a path curve for the complete scan of test parts the larger dimensions of which mean that a conventional scan is not possible. This criterion is based on how easy and unproblematic this extension is. The named test parts can be, for example, a long cylinder (e.g. tube), which cannot be completely imaged in its entirety because of the maximum possible magnification. In such a case, individual portions of the test part can be scanned sequentially in steps for a complete scan. For this purpose, a path curve is supplemented by further elements typical for it. A demonstrative example is the supplementing of the CLC path curve. If the CLC path curve cannot completely capture the elongate test part, this path curve is supplemented by further path curve elements in order that it becomes complete. In this example, the extension is obvious. In the case of other path curves, such as e.g. the TB path curve, a suitable extension is barely possible because of the characteristic progression of the path curve.

Optimizability and Redundancy

Figure 8:
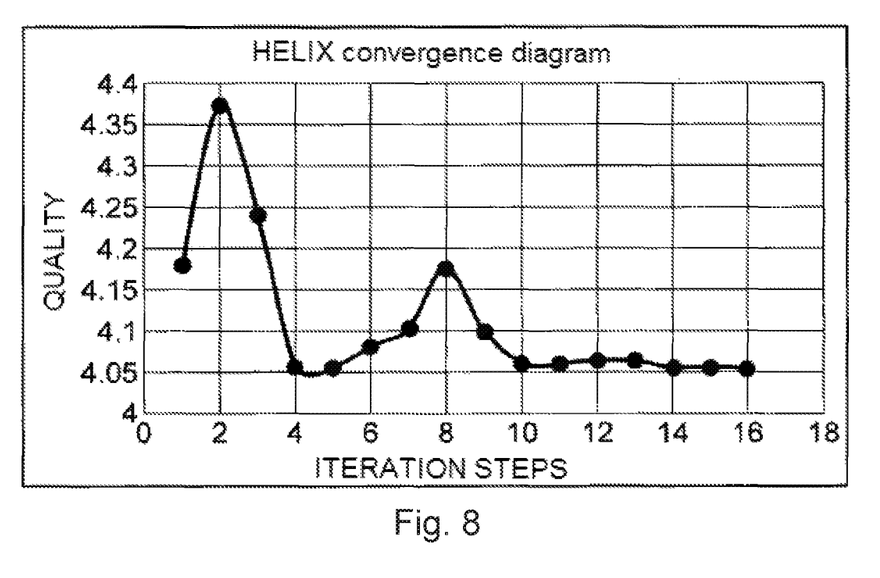
FIG. 8 is a convergence diagram of a helical path curve for a turbine blade.

A further criterion for the assessment of a path curve is the optimizability. The optimizability as a whole depends on numerous factors. In the following consideration, however, it is primarily determined by the required number of iteration steps of the optimization process, which corresponds to the speed of convergence (in FIG. 8, by way of example, a convergence diagram for a helical path curve is represented). The speed of convergence in turn depends on the number of parameters to be optimized and on the path curve length. When the simplex method is applied, an increasing number of optimization parameters results in further search directions accruing in the parameter space. In this case, the search for an optimum runs in a higher-dimensional parameter space and requires more time for this. Furthermore, a longer path curve length likewise leads to a longer scan duration. As this scan duration is required for the path curve to be travelled in each iteration step, it thus likewise has an effect on the general speed of convergence.

A further aspect associated therewith is the degree of redundancy of a path curve. It describes to what extent in a scan along the path curve images are recorded which are redundant for the reconstruction and thus provide no new information. For a parallel beam along a circular path curve, it is to be easily understood that the radiation through the test part traverses the same beam path after a 180° rotation. The X-ray image from both positions that forms is the same in terms of quality. Therefore, in the scan of a circular path curve with parallel radiation, a semi-circular path curve is sufficient. Similar considerations apply to cone radiation. Here, in theory, a half rotation (180°) plus the cone angle of the X-ray source is sufficient.

Summarizing Consideration

The assessments of the path curves for the turbine blade are recorded in tabular form in Table 1 below.

The optimized quality value follows from the above-outlined optimization process and is dependent on the test part selected. Here it relates to the turbine blade. The path curve length is likewise dependent on the geometry of the turbine blade. All further criteria relate to general characteristics of the respective path curve.

The LC path curve achieves the best assessment on average with respect to the criteria. It stands out due to its characteristically simple progression, which has a positive effect on the assessment of most criteria. It is conspicuous particularly due to a small optimized quality value, a short path curve length, a low level of complexity and a small influence of robot-specific features.

On average, the TB path curve performs with a similar, but slightly more negative assessment. It is conspicuous due to a small optimized quality value, a short path curve length, a small influence of robot-specific features and a good optimizability. Its characteristic progression leads to a high level of complexity, which has a negative effect, among other things, on the assessment. Due to its peculiar progression, it represents a special path curve which in principle differs greatly from the others.

The helical, CC and CLC path curves on average achieve a poorer assessment overall. They are very suitable with respect to some criteria, which can be seen from Table 1.

In the assessment of the path curves, the comparison criteria are usually not weighted identically. Each user must define the weighting distribution of the criteria with respect to individual objectives taking into consideration the peculiarities of the X-ray system used and the component to be tested. For a different weighting, the evaluations from Table 1 are included in the assessment with a weighting factor.

The optimization of the path curve with respect to the quality function leads to an improved ability of the test part to be radiographed. With an improved ability to be radiographed, an improved X-ray image quality as well as an improved X-ray image reconstruction of the test part is possible. For this reason the criterion of optimized quality value is to the fore. With respect to this criterion, the LC and the TB path curves achieve the best result according to Table 1.

The LC path curve leads to the best quality, although it has a comparatively simple characteristic progression. In the case of the TB path curve, the result has been expectable: its characteristic progression is suitable in the case of the elongate geometry of the turbine blade to prevent "bad" directions with respect to the radiographing of the test part. In the case of special test part geometries in which circular or linear paths do not lead to a satisfactory quality, it provides a potentially better result. The helical, CC and CLC path curves yield a moderate quality after the optimization process and are therefore less suitable for the optimization of the radiographing of the turbine blade.

The optimum sets of parameters of the path curves result in an optimized path for the turbine blade. Even along the optimized path curve, the ability of the turbine blade used to be radiographed is insufficient in the case of the X-ray system used. This is because, in the X-ray system used, the power of the X-ray source (225 kV X-ray tube) is not sufficient for an adequate radiographing. This fact was already known in advance and does not represent a problem, because within the framework of the invention the conceptual design of a basic optimization procedure which has been devised without limiting the generality on the basis of the X-ray system used is primarily involved. This optimization procedure can be transferred to other systems and other test parts.

Finally, on the basis of the known projective geometries in connection with the allocated projection images, a very good three-dimensional reconstruction of the test part can be effected via methods and algorithms known from the state of the art—for example by means of the "CERA Xplorer" software from Siemens Healthcare GmbH.

TABLE 1

|  | HLX | LC | CC | CLC | TB |
| --- | --- | --- | --- | --- | --- |
| Optimized quality value (T blade) | − | + | 0 | − | + |
| Trajectory length (T blade) | 0 | + | 0 | − | + |
| Magnification and space requirement | + | − | − | 0 | − |
| Complexity | 0 | + | + | + | − |
| Robot-specific features | − | + | 0 | 0 | + |
| Extensibility | + | 0 | − | + | − |
| Optimizability | 0 | 0 | 0 | − | + |

We claim:

1. A method for the reconstruction of a test part in an X-ray computed tomography (CT) method in an X-ray CT system, which has an X-ray with a focus, an X-ray detector, and a manipulator, which moves the test part within the X-ray CT system,
wherein, to generate recordings of the test part in various positions, the method comprises:
a) moving the manipulator along a sequence of predefinable parameterizable path curves, each of the sequence of path curves being a different path curve from a previous path curve, wherein the recordings of the test part are made at predetermined triggered positions along each of the sequence of path curves, the triggered positions remaining unchanged throughout the sequence of path curves, wherein said moving step comprises:
 i. determining, for each recording of a first iteration of the sequence of path curves, the position of the manipulator and calculating a respective associated projective geometry,
 ii. calculating a value of a quality function for a most recent path curve,
 iii. moving the manipulator along a next path curve of the sequence of path curves, wherein the next path curve has different parameters from the preceding path curve, wherein generation of further recordings of the test part at the unchanged triggered positions are made and the value of the quality function is calculated for the next path curve, and
 iv. repeating the moving the manipulator step (iii) along the next path curve a predetermined number of times,
b) determining an optimized path curve iteratively by means of an optimization algorithm at the value of the quality function which is calculated as being minimal in steps (i-iii),
c) generating recordings of further test parts identical to the test part used in steps (a-b) along the path curve in which the minimum of the quality function was previously established in step (b), and
d) performing a CT reconstruction for each test part by means of a reconstruction algorithm with reference to allocation of the individual recordings to the respective projective geometry.

2. The method according to claim 1, wherein the determination of the position of the manipulator is effected by markers which are arranged fixed to the test part while the X-ray CT method is being carried out.

3. The method according to claim 1, wherein the manipulator is a six-axis industrial robot.

4. The method according to claim 1, wherein the following quality function is used:

$$F = \sqrt{\alpha\left(1 - \frac{Q_{min}}{Q_{opt}}\right)^2 + \beta\left(1 - \frac{Q_{min}}{Q_{opt}}\right)^2\left(1 - \frac{\sigma}{\sigma_{opt}}\right)^2 + \gamma\left(1 - \frac{E}{E_{opt}}\right)^2} \stackrel{!}{=} \min$$

with weighting factors $\alpha$, $\beta$ and $\gamma$ representing priorities of the variables $Q_{min}$, $\sigma$ and E, with $Q_{min}$ being a minimum quantile from all recordings of a series, $Q_{opt}$ being an optimum value of the quantile, with $\sigma$ being a spread of the quantiles in relation to the minimum quantile, with $\sigma_{opt}$ being an optimum value of the spread, with E being the entropy, and with $E_{opt}$ being an optimum value of the entropy.

5. The method according to claim 1, wherein the optimization algorithm is a downhill simplex algorithm.

6. The method according to claim 1, wherein determination of the predefinable parameterizable path curve includes a further-quality function taking into account one or more criterion including path curve length, magnification, space requirement, complexity, robot movement parameters, extensibility, optimizability, and redundancy.

7. The method according to claim 1, wherein the method is interrupted after a predefinable maximum number of iteration steps and the method for testing the further test parts is carried out with the path curve of the last iteration step.

8. The method according claim 1, wherein the optimization is effected by tilting the test part.

* * * * *